United States Patent [19]

Squires et al.

[11] Patent Number: 5,121,262

[45] Date of Patent: Jun. 9, 1992

[54] DISK DRIVE SYSTEM EMPLOYING ADAPTIVE READ/WRITE CHANNEL CONTROLS AND METHOD OF USING SAME

[75] Inventors: John P. Squires; Louis J. Shrinkle, both of Boulder, Colo.

[73] Assignee: Conner Peripherals, Inc., San Jose, Calif.

[21] Appl. No.: 784,655

[22] Filed: Oct. 28, 1991

Related U.S. Application Data

[63] Continuation of Ser. No. 420,371, Oct. 12, 1989, abandoned.

[51] Int. Cl.[5] .............................................. G11B 5/09
[52] U.S. Cl. ........................................ 360/46; 360/53; 360/31
[58] Field of Search .................................. 360/46, 53

[56] References Cited

U.S. PATENT DOCUMENTS 4,796,109  1/1989  Sordello et al. .................. 360/31
4,799,112  1/1989  Bremmer et al. .................. 360/31

Primary Examiner—Vincent P. Canney
Attorney, Agent, or Firm—Fliesler, Dubb, Meyer & Lovejoy

[57] ABSTRACT

The read/write channel is programmatically adaptable to the media used for storing data in response to data signals and the read/write head used to transfer the data signals to and from the media. Adaptability is provided by progammable signal processing elements in the read/write channel. The programmable elements include a read threshold element for determining whether data signals transferred from the media exceed a data discrimination level determined by a first programmable value, and a data window element for determining whether data signals transferred from the media occur within a data signal window whose timing, relative to a data clock signal, is determined by the second programmable value. Additional programmable elements include an amplifier element that is programmed to provide a corresponding level of write current and a precompensation block for providing data signal precompensation. The programmable values are deterined by the disk drive uniquely for the media, read/write head and the read/write data channel.

10 Claims, 7 Drawing Sheets

DISK DRIVE SYSTEM EMPLOYING ADAPTIVE READ/WRITE CHANNEL CONTROLS AND METHOD OF USING SAME

This application is a continuation of Ser. No. 07/420,371, filed Oct. 12, 1989, now abandoned.

CROSS REFERENCE TO RELATED APPLICATIONS:

The present application is related to the following applications, all assigned to the Assignee of the present application:

1. VOICE COIL ACTIVATED DISK DRIVE PARKING DEVICE WITH MAGNETIC BIAS, invented by Kurt Michael Anderson, application Ser. No. 269,573, filed Nov. 10, 1988.

2. DISK DRIVE SYSTEM USING MULTIPLE EMBEDDED QUADRATURE SERVO FIELDS, invented by Louis J. Shrinkle and John P. Squires, application Ser. No. 07/386,504, filed Jul. 27, 1989.

3. DISK DRIVE SERVO SYSTEM USING GAIN LIMITED HIGH-FREQUENCY TRACK-FOLLOWING COMPENSATOR, invented by John P. Squires and filed concurrently herewith.

BACKGROUND OF THE INVENTION

1. Field of the Invention

The present invention is generally related to hard disk drives and, in particular, to the circuits, systems and algorithms for adaptively controlling the performance of the data read/write channel electronics to optimally match the electrical and electromagnetic characteristics of the heads and media of the disk drive.

2. Description of the Related Art

The design of conventional disk drives must necessarily take into account the inevitable tolerance variations in the drive's components. In particular, the data read/write error rate is premised on the combined tolerances of the precision components that make up the largely analog data processing circuits of the read/write data channel electronics. However, the effectiveness of the channel electronics in minimizing errors is, in substantial part, also dependent on the particular construction of the hard disk assembly (HDA), including the media's coercivity and thickness, the nominal flying height of the read/write head and the head's own electromagnetic characteristics, and the specific resistive, capacitive and inductive characteristics of the electrical connection between the head and the read/write channel electronics.

In a theoretical worst case analysis, the error rate is calculated on the sum total of the worst case tolerance variances of the individual components and subsystems in the read/write data channel and HDA. As a practical matter, data error rate calculated in this manner would be extremely low. Rather, in typical practice, assembled disk drives are first tested to determine whether they meet the probable performance of the drive as designed. Once published specifications are established for the drive manufacturing line, drives are tested to determine whether they continue to meet the published specifications. Where a drive is failed due to a high data error rate, the drive is analyzed to determine the components contributing the greatest amount to the error rate. The drive, when and to the extent reasonable, is then reworked to fix or replace the error prone components or, where the cost of such repairs would be to high, simply scrapped.

Naturally, the aggregate manufacturing cost of the drives are directly increased in proportion to the number of drives that must be reworked or scrapped. A typical strategy, Where higher than expected number of the drives are initially failed, is to modify if not reduce the specifications of the drive to pass sufficient numbers of the drives to make continued production commercially feasible.

A conventional alternative strategy is to implement an engineering design change to improve on the precision of the most typically failure causing components. Where the change is technically feasible, the cost of higher precision components, as well as the cost of implementing the design change, again directly impacts the aggregate cost of drive manufacture. When implemented, the design change is applied to all of the drives manufactured.

SUMMARY OF THE INVENTION

Therefore, a general purpose of the present invention is to provide a means of adapting the read/write channel electronics to the disk drive to obtain the optimum performance from the disk drive system.

This is accomplished in the present invention by providing a disk drive system having a read/write data channel that is programmatically adaptable in processing data signals transferred to and from the read/write head. Adaptability is provided by programmable signal processing elements in the read/write data channel. The programmable elements include a read threshold element for determining whether data signals transferred from the media exceed a data discrimination level determined by a first programmable value, and a data window element for determining whether data signals transferred from the media occur within a data signal window whose timing, relative to a data clock signal, is determined by the second programmable value. Additional programmable elements include an amplifier element that is programmed to provide a corresponding level of write current and a precompensation block for providing data signal precompensation. The programmable values are determined by the disk drive uniquely for the media, read/write head and the read/write data channel.

Thus, an advantage of the present invention is that it allows the read/write channel electronics to be optimally adapted to the hard disk assembly (HDA) after assembly of the drive and without mechanical adjustments.

Another advantage of the present invention is that it allows the adaptation of the electronics to the HDA to be performed automatically and, if chosen, repeatedly.

Yet another advantage of the present invention is that it allows both data reading and writing characteristics to be adjusted independently so as to obtain optimal inter-dependent operation.

Still another advantage of the present invention is that it obtains adaptability of the read/write data channel with a minimum of additional circuitry.

BRIEF DESCRIPTION OF THE DRAWINGS

These and other advantages and features of the present invention will become apparent when considered in conjunction with the following detailed description of the present invention and the drawings, wherein like reference numerals designate like parts throughout the figures thereof, and wherein.

DETAILED DESCRIPTION OF THE INVENTION

Figure 1:
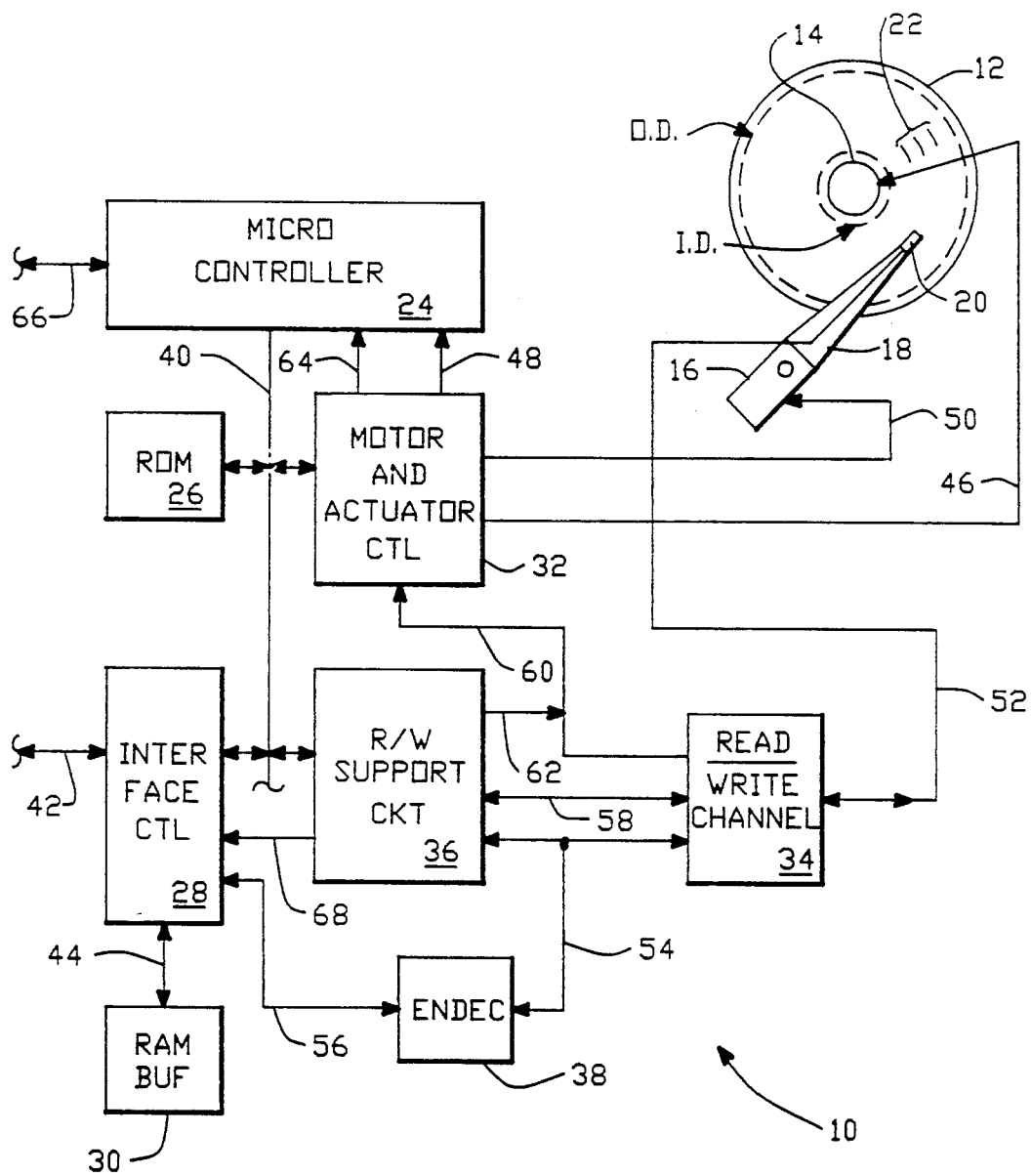
FIG. 1 is a simplified block diagram of a disk drive control system consistent with the present invention.

A disk drive system consistent with the principles of the present invention, generally indicated by the reference numeral 10, is shown in FIG. 1. The preferred embodiments of the present invention utilize an embedded microcontroller control system to manage and direct all essential functions of the mechanical aspects of the disk drive system. The drive system includes one or more disks 12 spun in parallel planes by a spindle motor 14. Data is stored in a data track band on each surface of a disk 12 defined by an outer (OD) and inner (ID) track diameter. An actuator assembly 16, including a load beam 18 and read/write head 20 per data surface, is utilized to transfer data with respect to concentric data tracks 22 within the track band. Thus, the primary control aspects of the system 10 include controlling the spin rate of the spindle motor 14 and the control of the actuator assembly 16 in positioning of the read/write heads 20 for the transfer of data with respect to selected data tracks.

A microcontroller 24, by utilizing a minimum number of dedicated control support circuits, directly implements all of the primary functions of the drive system 10. The electronic architecture of the present invention is described in detail in the above-identified co-pending related applications and are incorporated herein by reference. However, for purposes of completeness, the pertinent portions of the disclosures are set forth below.

In the preferred embodiments of the present invention, the microcontroller 24 is a three megahertz clock rate Motorola MC68HC11 HCMOS single chip microcontroller, as described in the MC68HC11A8 HCMOS Single Chip Microcomputer Technical Data Book (ADI 1207) available from Motorola, Inc., Motorola Literature Distribution, P.O. Box 20912, Phoenix, Ariz., 85036.

A read-only memory (ROM) 26 is coupled to the microcontroller 24 by way of a general purpose data, address and control bus 40. The ROM 26 is utilized to store a microcontroller control program for supporting five principle tasks necessary to implement the full functionality of the disk drive system 10. These tasks include interface, actuator, spin motor, read/write and monitor.

An interface control circuit 28 is provided to support the microcontroller 24 in execution of the interface task. The interface controller 28, in a preferred asynchronous SCSI embodiment of the present invention, is implemented as a Cirrus Logic CL-SH250 Integrated SCSI Disk Controller, manufactured and distributed by Cirrus Logic, Inc., and described by their CL-SH250 Technical Data Sheet, available from Cirrus Logic, Inc., 1463 Centre Pointe Drive, Milpitas, Cal. 95035. A comparable synchronous SCSI interface controller, the AIC-6110, is available from Adaptec, Inc., 691 South Milpitas Boulevard, Milpitas, Cal. 95035. A functionally equivalent interface controller, suitable for interfacing to the IBM Personal Computer Model "AT" peripheral bus, is also available from Cirrus Logic, Inc.

The interface controller 28, in general, provides a hardware interface between the disk drive system 10 and a host computer system, typically a data processing system, via a communications bus 42. The interface controller 28 utilizes a random access memory (RAM) buffer 30, accessible by a local data and control bus 44, to buffer data and commands received from or awaiting delivery to the host computer system. In this manner, the interface controller 28 is the primary manager of the bidirectional data stream between the communications bus 42 and the system 10 by way of the bus 40.

A motor and actuator controller 32 is provided as an internal interface between the microcontroller 24, the spin motor 14, and the actuator assembly 16. The controller 32 directly supports the commutation of the spin motor 14 by selectively providing commutation current to the motor 14 via the lines 46. Commutation state selection is effected by provision of a digital word from the microcontroller 24 to a commutation control latch within the controller 32. This word is used to select the field winding phase pair of the spin motor 14 that is to receive commutation current when commutation is enabled. The commutation current is switched by the controller 32 on to corresponding pairs of commutation current lines of the lines 46. A second control word, also latched by the controller 32, is used to enable the provision of commutation current.

A voltage proportional to the current conducted through the selected field winding phase pair of the spin motor 14 is provided as a current feedback voltage level, on line 48, to an analog-to-digital converter input of the microcontroller 24.

To control the actuator assembly 16, the controller 32 provides for the latched digital-to-analog conversion of a digital actuator position control word. The controller also provides voltage-to-current buffering of the resultant analog voltage. This output current is then provided on line 50 to the voice coil motor of the actuator assembly 16. The digital position control word, as provided via the bus 40 from the microcontroller 24, represents the desired actuator position. A second digital word may be written to a control register within the controller 32 to enable conversion of a newly presented digital position control word by the digital-to-analog converter.

A read/write channel controller 34, in combination with the interface controller 28, a read/write support circuit 36 and an encoder/decoder (ENDEC) 38, similarly acts as an internal control interface between the microcontroller 24 and the read/write heads 20 of the actuator assembly 16. The channel controller 34 buffers raw data transferred between the head 20, via the raw data lines 52, and the interface controller 28, via line 54, the ENDEC 38 and line 56. Raw data is also provided to the read/write support circuit 36, via line 54.

The operation of the read/write channel controller 34 is controlled by the read/write support circuit 36 via control lines 58. These control signals include servo burst gating signals for routing the received raw data, corresponding to each of four servo bursts, onto raw peak detector signal lines 60. These raw peak signals are provided through the motor and actuator controller 32, for sample-and-hold buffering, and onto lines 64 to respective analog-to-digital converter inputs of the microcontroller 24. The control lines 62 allow the read/write support circuit 36 to reset the sample-and-hold circuits.

The interface controller 28, in combination with the ENDEC 38, provides for the buffered serialization and deserialization and data clock encoding/decoding of data. However, the read/write support circuit 36, from the raw data received via line 54, is used to detect the sector mark and to acquire gray code data from each servo sector field embedded in the data tracks. A sector mark detect signal is provided via line 68 to the interface controller 28 to initiate any pending sector data processing.

Configuration and initiation of disk read/write functions by the interface controller 28 and read/write support circuit 36 are performed under the direct control of the microcontroller 24. That is, both of these controllers 28, 36 are programmable by the microcontroller 24.

The mechanical configuration of a disk drive embodying a preferred embodiment of the present invention is described in VOICE COIL ACTIVATED DISK DRIVE PARKING DEVICE WITH MAGNETIC BIAS and is incorporated herein by reference. The aspects of the mechanical structure pertinent to the present invention are set forth in Table 1 and Table 2 below.

TABLE 1

| | | |
|---|---|---|
| Number Data Cylinders | 1368 | cylinders |
| Sectors per Track | 39 | sectors |
| Number of Disks | 4 | |
| Number of Data Surfaces | 8 | |
| Bytes per Sector | 662 | bytes |
| Data Bytes per Sector | 512 | bytes |
| Data Capacity per Data Surface | 27.3 | Mbytes |
| Total Data Capacity | 219 | Mbytes |

TABLE 2

| | | |
|---|---|---|
| Disk Diameter | 96 | millimeters |
| Data Track Band Width | 30 | millimeters |

TABLE 2-continued

| | | |
|---|---|---|
| Track Density | 1700 | tracks/inch |
| Bit Density (max) | 22.000 | fci |
| Head Width | 11 | micrometers |
| Track Width | 15 | micrometers |

Figure 2:
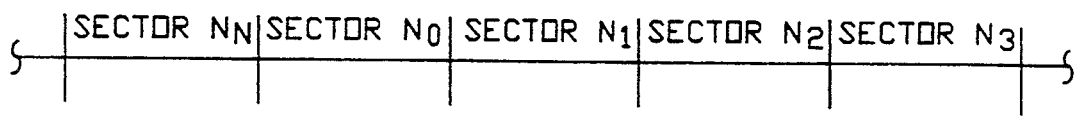
FIG. 2 is a simplified representation of a portion of a data track with the plurality of sectors provided thereon.
Figure 3A:
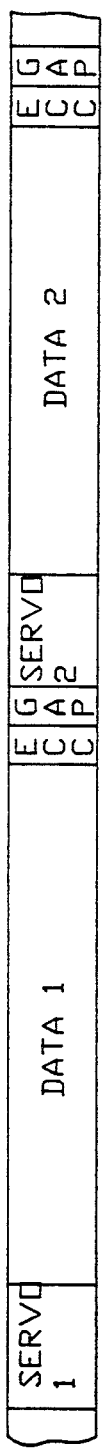
FIGS. 3a–b illustrate the distribution of servo control information and data in a simple, exemplary sector as provided in accordance with the present invention.
Figure 3B:
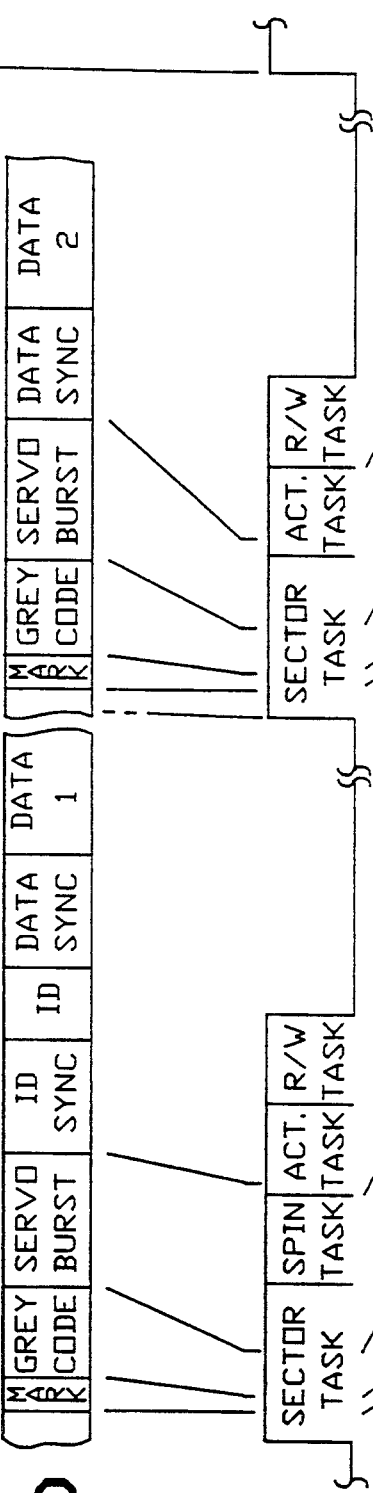

As generally represented in FIG. 2, each track of the concentric data tracks 22 provided on the surface of a disk 12 are further subdivided into sectors $N_{0-n}$. In accordance with the present invention, and as generally shown in FIG. 3a, each sector is composed of a servo 1 field, a data 1 field, first error correction code (ECC) field, mid-sector gap field, servo 2 field, data 2 field, second ECC field, and final gap field. As shown in FIG. 3b, the servo 1 field is further composed of a servo mark field, gray code field, servo burst field, ID sync field, ID field, and data sync field. Similarly, the servo 2 field is composed of a second sector mark field, second gray code field, second servo burst field and finally, a second data sync field. The order and size of these fields are set forth in Table 3.

TABLE 3

| Half Sector "A" Field | Bytes | Half Sector "B" Field | Bytes |
|---|---|---|---|
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 267 |
| ID CRC | 2 | ECC | 7 |
| Pad | 4 | Gap | 17 |
| Data Sync | 12 | | |
| Data | 245 | | |
| ECC | 7 | | |
| Gap | 17 | | |
| 331 Bytes (1st half) | | 662 Bytes Total | |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values of like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency physically offset in a predefined pattern from the center line of the data sector.

The ID sync field of the servo 1 field is also written at constant frequency and voltage, though physically centered on the track center line. The ID sync field allows the read/write controller to distinguish the first bit of the ID field. The ID field is used to store the cylinder, sector, and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Figure 4:
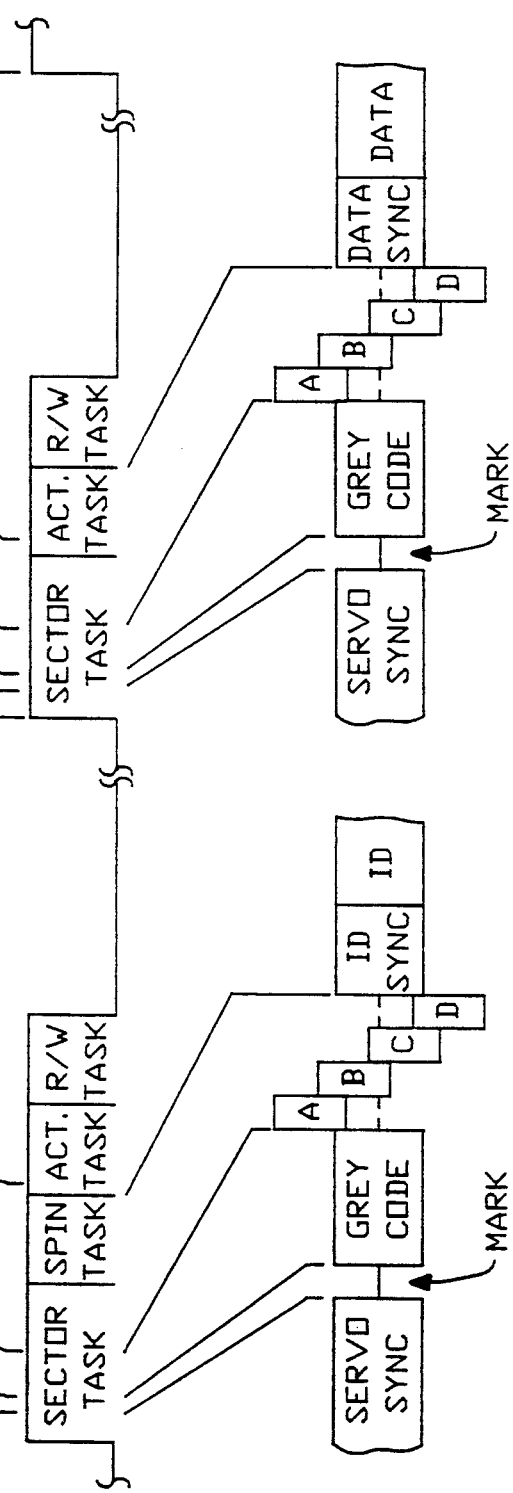
FIG. 4 illustrates the task management control system flow structure of the microcontroller of the present invention in processing the servo control information of the sector shown in FIGS. 3a–b.

Referring now to FIG. 4, task execution as performed by the microcontroller 24 is shown mapped against the real time occurrence of the servo 1 and 2 fields with respect to a read/write head 20. The basic real time relations pertinent to the present invention are set forth in Table 4.

TABLE 4

| Disk Rotational Speed | 350 rpm |
|---|---|
| Average Access Time | 19 millisecs. |
| Minimum Track-to-Track Transition Time | 28 microsecs. |
| Sector Period | 433 microseconds |
| Servo Sample Rate | 4.6 KHz |
| Time Over Burst (each) | 2.665 microsecs. |
| Bytes Read per Track at Max Seek Rate | 43 bytes/track |
| Time over Gray Code | 5.33 microsecs. |

Specifically, a sector task is initiated in response to a countdown timer interrupt just prior to the occurrence of the servo 1 field. From this interrupt, the microcontroller 24 enables the read/write support circuit 36 to detect and process the sector mark field. A control value is then provided to the spin motor and actuator controller 32 to commutate the spin motor 14.

Figure 5:
FIG. 5 illustrates the detailed presentation of the servo control information of the exemplary sector, shown in FIGS. 3a–b, as provided in accordance with the present invention.

As shown in FIG. 5, the sector mark field is defined by the trailing end of the servo sync filled gap field and the sector mark. The gap field is another constant amplitude constant and frequency field. The sector mark is defined as the first read data transition following the absence of any servo sync transitions for three bytes of servo sync clock cycles. The time of occurrence of the sector mark is recorded by a hardware timer within the microcontroller 24 for use in subsequent tasks as well as scheduling the countdown timer interrupt necessary for processing the servo 2 field.

During the sector task, the gray code and sector bursts are captured by the read/write support circuit 30 via the line 54 as coupled to the read/write channel controller 36. An automatic gain control circuit (AGC) is provided in the controller 34 to adjust the amplitude of the raw data signal. In anticipation of the gray code and servo burst fields, the read/write channel controller 34 is enabled by the microcontroller 24, via the read/write support circuit 36, to boost the gain of the AGC to compensate for reduced signal amplitudes. Although the AGC would automatically adjust its gain, the response time of the AGC is enhanced by direct adjustment of its gain just prior to or at the beginning of the gray code field.

Capture of the gray code by the read/write support circuit 36, though also earlier enabled by the microcontroller 24 during the servo sync corresponding portion of the sector task, is triggered internally by the sector mark signal internally produced upon detection of the sector mark. Similarly, capture of the four servo burst fields is triggered following a pre-defined delay, equal to the gray code length, following detection of the servo mark. The actual capture of the analog read amplitudes corresponding to each of the servo burst fields is performed by four sample and hold circuits individually gated to match the real time occurrence of the respective servo burst fields.

Meanwhile, the microcontroller 24 completes the sector task and transitions to a spin motor control task. The primary function of spin control task is to determine any rotational speed error of the spin motor 14 based on the previous actual and expected time of occurrence of the sector mark. A spin rate adjustment value may then be determined for use in the next servo 1 field sector task.

Next, an actuator task is executed by the microcontroller 24. This task is generally initiated subsequent to the A/D conversion of the servo burst fields. The first action undertaken by the microcontroller 24 in execution of the actuator task is to determine whether an actuator seek operation is pending or on off-track error was prior determined. In either case, execution continues with a setup of a corresponding seek operation for subsequent execution. If, however, track-following is to be performed, the four servo burst corresponding digital values are processed by the microcontroller 24 to derive a quadrature servo burst track-following error value ($P_0$). Assuming that the B and C servo burst fields, as shown in FIG. 5, overlap the center line of the current data sector (known by whether the current track number is odd or even), the quadrature processing of the servo burst field values is done in accordance with Equation 1:

$$P_0 = (A+B) - (C+D) \qquad \text{Eq. 1}$$

Although all four bursts are present and available for use, an alternative is to use, per Equation 2, only the two bursts that overlap the track center line during normal track-following while using all four bursts during seeking.

$$P_0 = (B-C) \qquad \text{Eq. 2}$$

Where the A and D sector bursts overlap the center line of the current data sector, i.e., every other track, the quadrature processing is performed in accordance with Equation 3 or, in the alternative, Equation 4:

$$P_0 = (C+D) - (A+B) \qquad \text{Eq. 3}$$

$$P_0 = (D-A) \qquad \text{Eq. 4}$$

A positive track-following error result is interpreted to indicate that the read/write head needs to be moved toward the inner diameter of the disk 12. The magnitude of the result gives an indication of the distance to the track center line. Thus, the microcontroller 24 may readily compute an error adjustment value based on the polarity and magnitude of the quadrature derived track-following error. The error adjustment value is combined with the current actuator position control value and written to the digital-to-analog converter of the motor and actuator controller 32. The adjusted analog actuator position control signal thereby produced results in a corrective change in the position of the actuator assembly 16 and the head 20 relative to the current data track.

The microcontroller 24 may then transition to a read/write task. Execution of the read/write task provides for the set-up, continuance, or completion of the transfer of data with respect to the current data sector.

Finally, any pending seek operation is executed by the microcontroller 24 just prior to the conclusion of the read/write task. In general, the seek operation selected during the actuator task determines an actuator position value to initiate, continue, or complete a seek operation of the actuator assembly 16. The read/write task then completes with the execution of a return from interrupt instruction.

The sector task of the servo 2 field is initiated in response to the countdown timer interrupt as scheduled in the servo 1 sector task. The microcontroller 24 then executes sector, actuator, read/write and seek tasks that are substantially identical to their counterparts executed with respect to the servo 1 field, including scheduling the count down timer interrupt for the next sector's servo 1 task start.

The balance of the sector period not otherwise spent processing the servo 1 and servo 2 fields is used to execute the interface task and, if active, the monitor task. Thus, the microcontroller 24 operates as an essentially multi-tasking processor in the control and management of the disk drive system 10.

Of particular relevance to the present invention is the monitor task. This task is normally invoked when a drive is initially powered up. The monitor task may also be invoked from the interface task to retest the drive following, for example, a reworking of the HDA to replace a disk having a too high a number of physical defects. Of particular significance is the fact that the monitor task is performed at least on power up of every disk drive incorporating the present invention. Thus, testing is comprehensive, not just statistical.

The function of the monitor task is to perform a series of tests to evaluate the functionality and performance of the drive. For this purpose, a direct serial interface, via line 66, is provided to the microcontroller 24. An ordinary dumb terminal can be used to observe the progress and relative success o failure of the tests.

Figure 6:
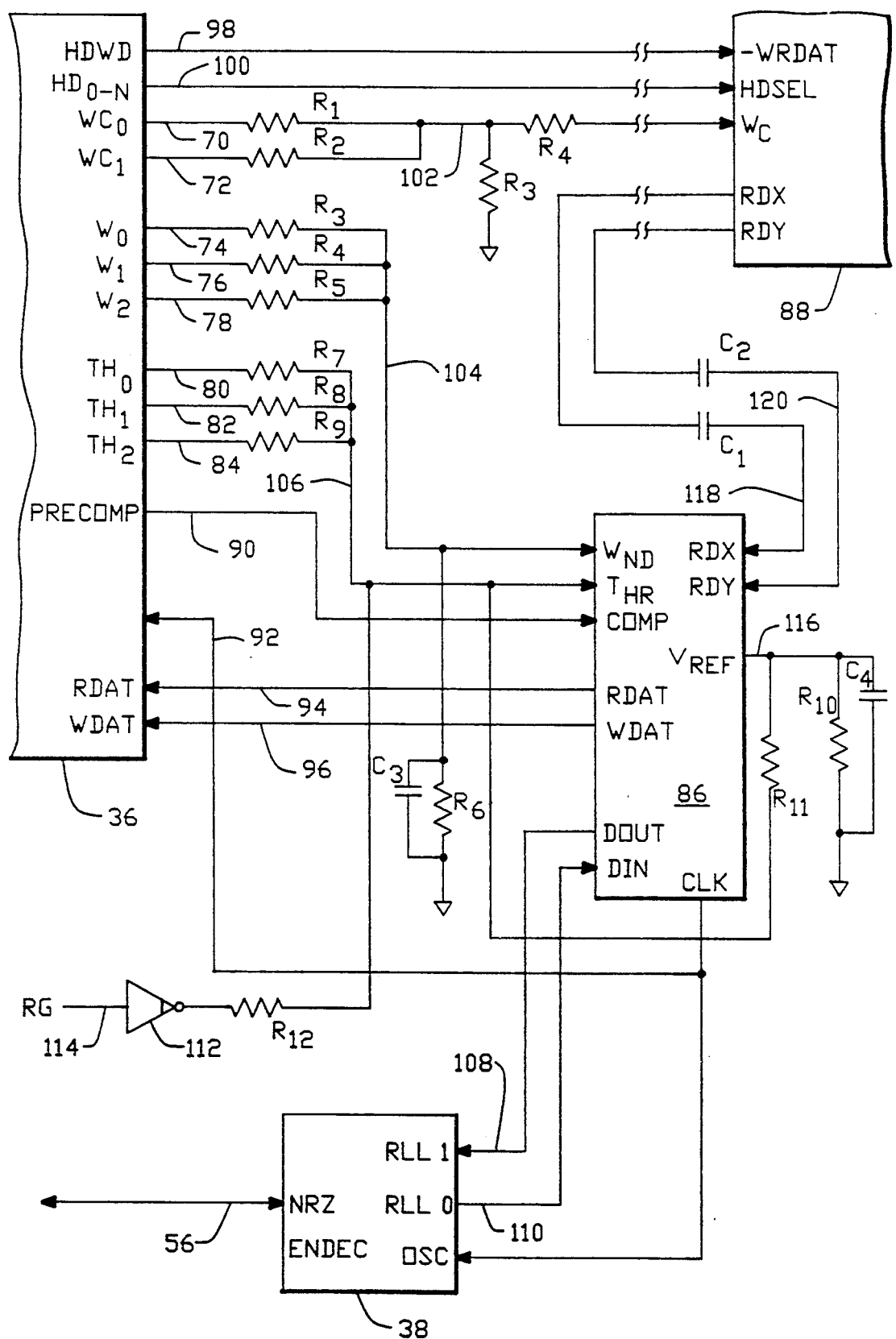
FIG. 6 is a detail of the interconnection of the read/write control channel electronics consistent with the preferred embodiment of the present invention.

One particular aspect of the performance tests performed by the monitor task is to determine a number of programmable settings that, in turn, can be used to significantly affect the performance of the read/write data channel. These setting are programmable by the microcontroller 24 by writing control words to a conventional latched register within the read/write support circuit 36. As shown in FIG. 6, nine programmable bits of a latched register directly provides the signals: precomp, on line 90; write current ($WC_{0-1}$) on lines 70, 72; read data threshold ($TH_{0-2}$) on lines 74, 76, 78; and data window delay ($W_{0-2}$) on lines 80, 82, 84. With the exception of the precomp signal, these signals are buffered, internally to the read/write support circuit, to provide open-collector transistor type outputs.

The precomp signal is provided to the read/write channel circuit 86 to select precompensation of the serial data stream as it is processed through the read/write channel circuit 86. The write data stream originates with the interface controller 28, is transferred via line 56 to the ENDEC 38 for encoding as a run length limited bit-serial stream on output line 110 to the read/write channel circuit 86. Once processed by the read/write channel circuit 86, the data stream is passed via the write data line 96 and buffered through the read/write support circuit 36 onto the hard disk write data line 98. This line passes into the hard disk assembly and to a final signal processing circuit 88 before being provided to a read/write head selected by the head select signals, on lines 100, provided from the programmable outputs ($HD_{0-n}$) of the read/write support circuit 36. In a preferred embodiment of the present invention, the circuit 88 is a conventional hard disk preamplifier and head data multiplexer circuit, such as the SSI 117 manufactured by Silicon Systems, Inc., 14351 Myford Road, Tustin, Cal. 92680-7022 or the ML501R manufactured by Micro Linear, Inc. 2092 Concourse Drive, San Jose, Cal. 95131.

The write current outputs, coupled through the binary value weighting resistors $R_{1-2}$ and base current level setting resistors $R_{3-4}$ produce a net resistance that sets the data write current level provided by the signal processing circuit 88. In the preferred embodiment of the present invention utilizing the SSI 117, the write current level is determined by Equation 5:

$$I_{wc} = 7 \text{ Volts}/R_{net} * G_{wc} \qquad \text{Eq. 5}$$

where:

$I_{wc}$ is write current in milliamperes;

$R_{net}$ is the combined resistance of R1-4 where $R_1$ = 200 Ohms, $R_2$ = 390 Ohms, $R_3$ = 200 Ohms, and $R_4$ = 0 Ohms ±1%, respectively, subject to the logic levels of $WC_{0-1}$; and $G_{wc}$ is a gain factor of 20.

Control of the data write current affords direct control of the electromagnetic writing of data bits to the surface of the disks. Ideally, a data bit is written with sufficient current to reach magnetic saturation. Writing with greater current increases the size of the magnetic domain written. This, in turn, will disturb and thereby effectively reduce the likelihood of correctly reading the adjacent domain data bits. The necessary saturation current level is directly dependent on the manufactured characteristics of the magnetic surface layer of the disk. Such characteristics may vary significantly between disk lots.

The read data is provided from the heads and preamplified by the signal processing circuit 88. The read data differential signal are passed, via RDX and RDY lines 118, 120 out of the HDA and through decoupling capacitors C1 and C2 (680 picofarads, ±2%) to the read/write channel circuit 86. There, the differential signal is amplified, using a conventional automatic gain control (AGC) stage, processed through a read data threshold detector to produce a raw data signal, and then passed through a data separator to separate the raw data clock and data from the raw data signal. The raw data signal is also buffered and provided onto the output line 94 to the read/write support circuit for sector mark detection, gray code capture and gating of the servo bursts. The separated raw data and data clock are provided to the ENDEC 38 via the data out line 108 and clock line 92.

The logic signals $TH_{0-2}$ are used to select the differential voltage level that is, in turn, used to discriminate data transitions from noise in the differential raw data signal read from the disk. The magnitude of the read data threshold level is set proportional to the voltage level established at the THR input of the read/write channel circuit 86. A resistor R11 (750 Ohms at ±1% tolerance) connects the THR input to a reference voltage, $V_{ref}$, which is generated by the read/write channel circuit 86. The $V_{ref}$ potential is maintained at about 2.5 volts by the resistor $R_{10}$ (4.3K Ohms at ±1% tolerance) and capacitor $C_4$ (0.0022 microfarads). This results in a preferred base threshold level of ±40% of the nominal peak to peak voltage output by the AGC stage.

The voltage at the THR input can be directly altered by the selective, binary coded provision of the logic signals $TH_{0-2}$. These open collector signals are coupled through the resistors $R_{7-9}$, having respective values of 62K, 120K and 240K each at a tolerance of ±1%, to the line 106. The binary combinations of the signals $TH_{0-2}$ result in a corresponding reduction in the voltage at the THR input and increase in the differential threshold voltage. In the preferred embodiment of the present invention, any one of eight incremental increases of ±2% of the threshold voltage level can be selected under program control. Ideally, the read data threshold is set high enough to avoid detecting noise as data transitions, but low enough to recognize low peak amplitude data bit signals. Randomly occurring low peak signals are a natural consequence of drop-out in the reading of the data bits. As to be expected, the AGC stage is generally ineffective in correcting for such individual low peak amplitudes. Consequently, selection of a read data threshold is a tradeoff that can be best made in testing of the specific combination an HDA and the read/write data channel electronics.

The output of an open collector invertor 112 is also connected, through a resistor $R_{12}$ (150K Ohms) to the line 106. The input of the invertor 112 is the read gate (RG) signal, as provided by the interface controller 28 via line 114, to define the period of time when data is being read from the disk. The presence of the invertor 112 has the effect of further reducing the threshold voltage level while reading sector data, yet allowing a higher threshold voltage level while the sector header, including the grey code, is being read from the disk. The sector header is effectively written with a lower data rate and is therefore less susceptible to data bit drop out that cannot be adequately compensated for by the AGC stage.

The logic signals $W_{0-2}$ are used to select the relative timing of data transitions within a qualifying data clock window. An RC circuit formed by a parallel resistor $R_6$ and capacitor $C_3$ coupled between the window timing control line 104 and ground establishes an approximate baseline 25 nanosecond delay of the raw data transitions behind the occurrence of the separated data clock transitions. The resistors $R_{7-9}$ allow the effective resistance of resistor $R_{14}$ to be altered, depending on the logic state of the signals $W_{0-2}$, thereby reducing the delay of the raw data. In the preferred embodiments of the present invention, the resistors $R_{6-9}$ are 2.0K, 6.2K, 12K and 24K Ohms, respectively, each having a tolerance of ±1%. The capacitor $C_3$ is preferably 68 picofarad. This choice of resistor and capacitor values realizes an ability to select one of eight discrete decramental delays differing by 1 nanosecond each.

Figure 7:
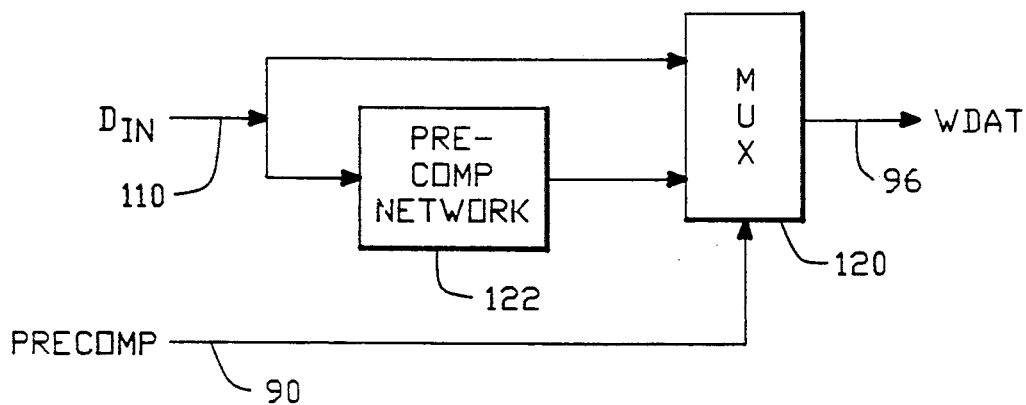
FIG. 7 is a block diagram of the programmable pre-compensation circuit of the present invention.

The programmable signal processing elements of the utilized in the preferred embodiments of the present invention are shown and described in greater detail relative to FIGS. 7-13. The programmable precompensation circuit of the present invention is shown in FIG. 7. Write data, from line 110, is provided to one input of an analog signal multiplexer 120. The write data is also provided to a precompensation network 122 of conventional design. The resulting precompensated write data is provided to the second input of the multiplexer 120. The digital precomp signal, provided on line 90, is used to select, under program control, either the write data or precompensated write data for provision by the multiplexer 120 on its output line 96. Thus, there is no fixed data track, typically relative to the outer diameter of the data track band, that is used as a threshold for switching to the use of precompensated data.

Figure 8:
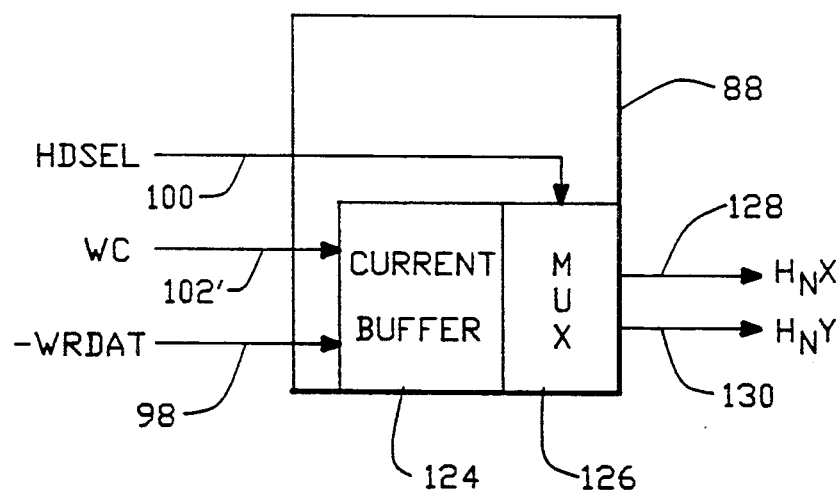
FIG. 8 is a block diagram of the programmable write current controller of the present invention.

FIG. 8 shows the essential internal blocks of the signal processing circuit 88 utilized in achieving programmable write current selection. The signal processing circuit 88 includes a current buffer 124 whose output write current level is, as recognized in the present invention, dependent on the level of current conducted from its WC signal input. The logic state of the current buffer 124 is determined by the data provided on the write data input line 102, The output of the current buffer 124 is provided to a differential analog signal multiplexer for provision on to one of four or eight pairs of head data lines 128, 130 that are connected to corresponding read/write heads.

Figure 9:
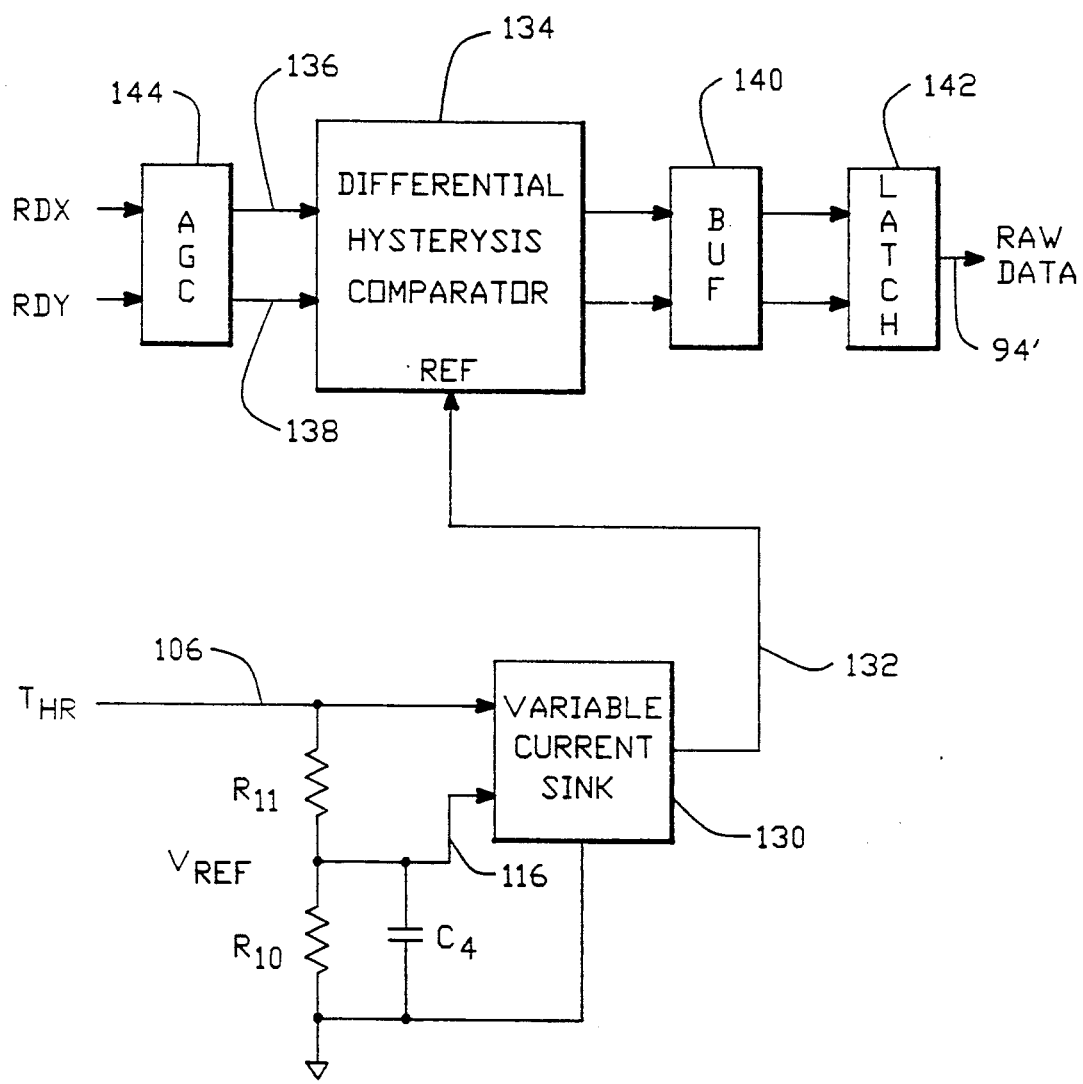
FIG. 9 is a block diagram of the programmable threshold detection circuit of a preferred embodiment of the present invention.
Figure 10:
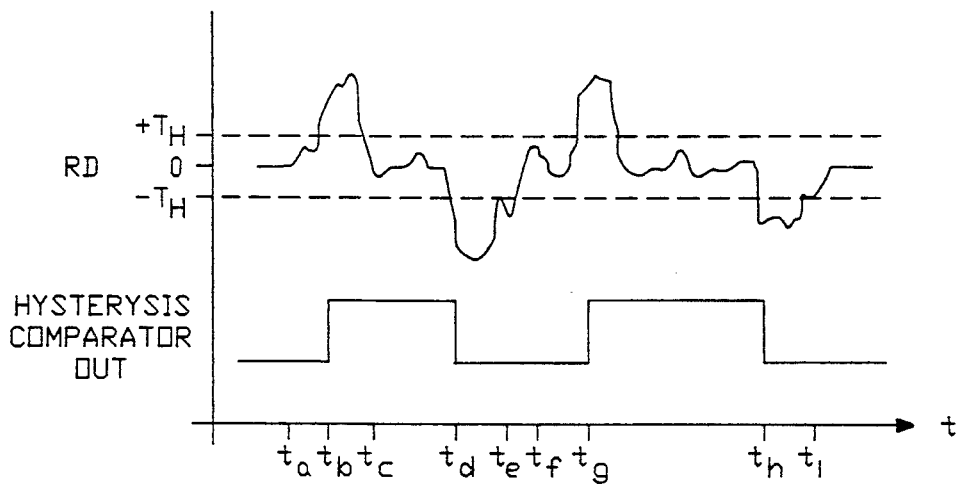
FIG. 10 is a graph illustrating the operation of the programmable threshold detection circuit of a preferred embodiment of the present invention.

Considering now the reading of data, the raw differential read data signal, RDX, RDY, is first processed through the AGC stage 144 of the read/write channel circuit 86, as shown in FIG. 9. The AGC output signal is provided to a differential hysterisis comparator 134 via AGC output lines 136, 138. An example of the AGC output signal is shown in FIG. 10. The comparator 134 functions to detect differential signal crossings of mirror positive and negative voltage thresholds, +TH and −TH. Both the positive and negative voltage thresholds are set by a common reference current. A variable current sink 130 sinks the reference current provided via line 132. The level of the reference current is set by the current sink 130 dependent on the voltage difference between the $V_{ref}$ and THR inputs 116, 106. As the voltage difference is increased, the current sink 130 draws more reference current. This results in an increase in the magnitude of the voltage thresholds used by the comparator 134 to detect data transitions.

As data transitions are detected, a differential output signal is produced that corresponds to the threshold transitions. Such is shown in FIG. 10 as the hysterisis comparator output signal. Transitions are detected at $t_b$, $t_d$, $t_g$, and $t_h$. The specific value of the threshold is significant in that false transitions due to noise may occur or, conversely, a proper data transition may fail to be detected depending on the specific read data threshold used. For example, the noise peak at $t_f$ would be detected as the data transition if the magnitudes of the read data thresholds were slightly lower. The resulting data edge would therefore be early, potentially resulting in a subsequent read error. However, setting the threshold too high would result in the shallow peak amplitude signal at $t_h$ being missed entirely. Again a read error would result. The programmability of the threshold allows the non-arbitrary active selection of the largest noise margin optimally balanced against the recognition of proper data transitions uniquely with respect the noise and specific component values of the entire read/write channel electronics and attached HDA.

The differential output signal is provided by the differential hysterisis comparator 134 to a buffer 140 and monostable latch 142. The latch 142 produces a logical raw data signal on its output line 92, and, therefrom, onto the RDAT output line 92.

Figure 11:
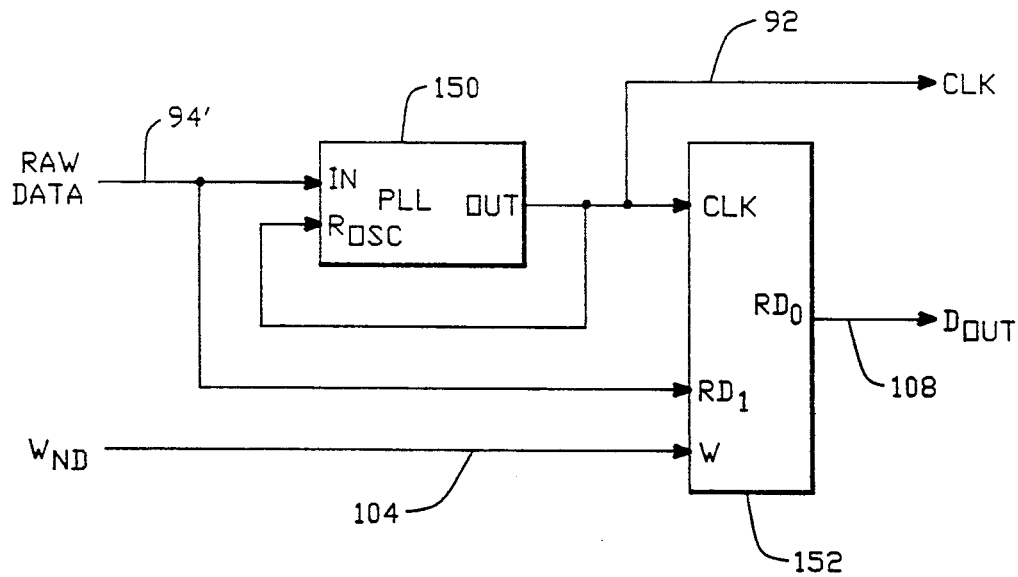
FIG. 11 is a block diagram of the data separator circuit constructed in accordance with a preferred embodiment of the present invention.

A data separator incorporating the programmable window selection control of the present invention is generally shown in FIG. 11. The raw data signal, provided via line 94', is used as an input to a phase locked loop (PLL) circuit 150. The regenerated clock signal provided on the PLL output line 92 is fed back to the PLL as a reference oscillator signal. The regenerated clock, raw data signal and the window delay signal, Wnd, are provided as inputs to a data separator circuit 152.

Figure 13:
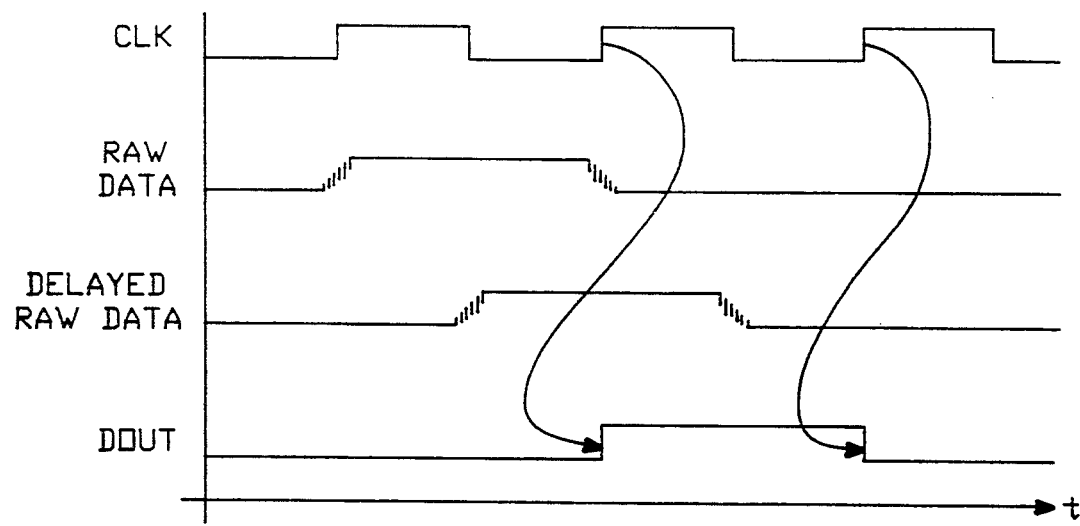
FIG. 13 is a graph illustrating the operation of the programmable raw data window control circuit of a preferred embodiment of the present invention.

As shown in FIG. 13, the edge transitions of the raw data signal and the clock are generally aligned as a consequence of the clock being regenerated from the raw data signal itself. However, due to jitter in the raw data signal and in accordance with the present invention, it is preferred to delay the raw data signal with respect to the significant clock edge transition so as to align the data transitions within a data window defined by significant clock edge transitions. Ideally, the delay is one-half of the clock period. However, a delay designed as a fixed amount will vary dependent on the specific component values used in the read/write channel electronics. Further, the criticality of the delay precision will increase as the serial raw data rate increases. Thus, by establishing a base delay reducible by the programmable selection of small delay periods, the present invention affords an individual adjustability of the data window with respect to the significant data transitions.

Figure 12:
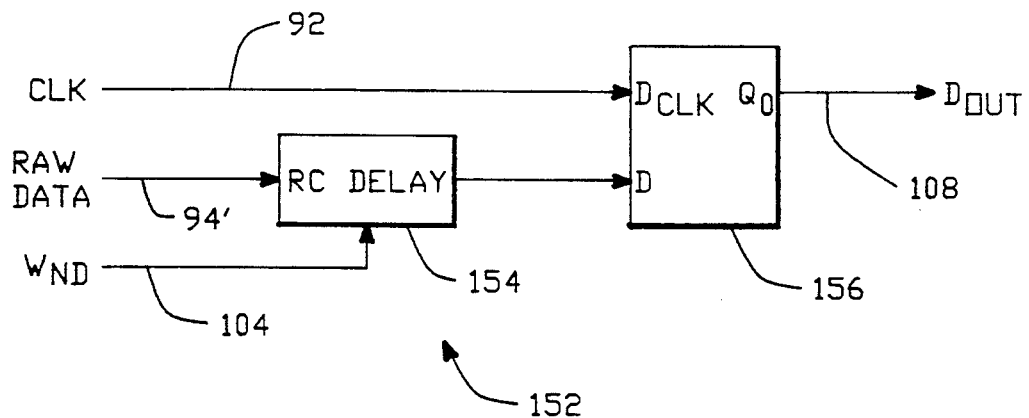
FIG. 12 is a block diagram of the programmable raw data window control circuit of a preferred embodiment of the present invention.

As shown in FIG. 12, the raw data signal provided on line 94' is effectively delayed through an RC delay line 154. The output of the delay line 154 is provided as the D input of a D-type flip-flop 156. Finally, the flip-flop 156 provides the recovered data signal onto its $Q_o$ output line 108 ($D_{out}$).

The D input is level sensitive. The regenerated clock is provided to a $D_{clk}$ input of the flip-flop 156, via line 92. The $D_{clk}$ input is rising edge sensitive. Consequently, the RC circuit formed by resistor $R_6$ and capacitor $C_3$, as shown in FIG. 6, is adequate to act as the RC delay 154 in providing a base delay to the raw data signal. Additional resistors $R_{3-5}$, when coupled to ground, decrease the delay of the raw data signal from the rising edge of the regenerated clock signal.

Tables 5-8 below provide the algorithms executed by the monitor task to test, analyze and program the optimum programmable settings for the precompensation track, write current level, read threshold and window delay timing. While generally executed only during the initial testing of the drive, these tests can be run for recertification of the drive, upon repair for an unrelated failure, or potentially executed periodically to adapt to changing environmental and aging effects on the precise component values of the read/write channel electronics and the electromagnetic characteristics of the head and media.

TABLE 5
Threshold Test

```
initialize;
seek to test track;
for head 0 to 7 do
    for read threshold level 0 to 7 do
        prepare test data to write;
        write data to track;
        for window delay level 0 to 7 do
            read data from track;
            count and store number of errors
                for each delay level;
        endfor
        begin
            calculate figure of merit
                reflecting composite write
                current/window/threshold
                error levels;
            store in data array;
        end
    endfor
    select best threshold level setting;
    store in EEPROM;
endfor
```

TABLE 6
Write Current Test

```
initialize;
seek to test track;
```

TABLE 6-continued
Write Current Test

```
for write current level 0 to 3 do
    for read threshold level 0 to 7 do
        prepare test data to write;
        write data to track;
        for window delay level 0 to 7 do
            read data from track;
            count and store number of errors
                for each delay level;
        endfor
        begin
            calculate figure of merit
                reflecting composite write
                current/window delay/threshold
                error levels;
            store in data array;
        end
    endfor
    select best write current level setting;
    store in EEPROM;
endfor
```

TABLE 7
Precompensation Test

```
initialize;
for ODtrack#-100 to ODtrack# do
    set precomp on;
    prepare test data to write;
    write data to track;
    for window delay level 0 to 7 do
        read data from track;
        count and store number of errors
            for each delay level;
    endfor
    set precomp off;
    prepare test data to write;
    write data to track;
    for window delay level 0 to 7 do
        read data from track;
        count and store number of errors
            for each delay level;
    endfor
    compare number of errors;
    select precomp level with the least number of
        errors;
    store in EEPROM;
endfor
```

TABLE 8
Read Window Test

```
initialize;
seek to test track;
prepare test data to write;
write data to track;
for window delay level 0 to 7 do
    read data from track;
    count and store number of errors
        for each delay level;
endfor
select best window delay level;
store in EEPROM;
```

Thus, a system and method for matching the read/write channel electronics to the specific electromagnetic characteristics of a unique hard disk assembly has been disclosed.

As should be readily apparent from the foregoing disclosure, many modifications and variations of the present invention are possible in light of the above description of the preferred embodiments. It is therefore to be understood that, within the scope of the appended claims, the present invention may be practiced otherwise as specifically described herein.

We claim:

1. A disk drive comprising:
   a) a media for storing data in response to data signals;
   b) means for transferring data signals to and from said media, said transferring means including means for providing a data clock signal with data signals transferred to said media and recovering said data clock signal from data transferred from said media;
   c) programmable means, coupled to said transferring means, for processing data signals transferred to and from said media, said programmable means being responsive to first and second programmable values, said programmable means including means for determining whether data signals transferred from said media exceed one of a plurality of data discrimination levels selectable by said first programmable value, and means for determining whether data signals transferred from said media occur within one of three or more data signal windows whose timing offset, relative to said data clock signal, is selectable by said second programmable value; and
   d) control means for determining said first and second programmable values, said control means including a microprocessor coupled to said processing means to permit independent programming of said first and second programmable values.

2. The disk drive of claim 1 wherein said control means includes means for determining said first and second programmable values uniquely for said media and said transferring means.

3. The disk drive of claim 1 or 2 wherein said programmable means further includes means, responsive to a third programmable value, for selecting one of a plurality of levels of write current for use in transferring data signals to said media by said transferring means, and wherein said control means selects said third programmable value.

4. The disk drive of claim 3 wherein said media stores data in a plurality of data tracks and wherein said programmable means further includes means, responsive to a fourth programmable value, for selecting one of a plurality of levels of precompensation for data signals transferred to said media by said transferring means with respect to a predetermined data track, and wherein said control means determines said fourth programmable value.

5. A disk drive comprising:
   a) a disk assembly including a media for storing data in a plurality of data tracks, means for rotating said media, a read/write head positionable over said media for reading and writing data with respect to a predetermined data track of said media, and means for positioning said read/write head; and
   b) an electronics assembly coupled to said head, said electronics assembly including first programmable means for selecting a write current level to be used in writing data to said media, second programmable means for selecting a threshold for qualifying data read from said media, third programmable means for selecting a data window by which data transitions are qualified, fourth programmable means for selecting to precompensate data to be written to the data tracks, and control means for selecting first, second, third, and fourth program values to be provided to said first, second, third and fourth programmable means, respectively.

6. A disk drive comprising:
   a) a media for storing data in response to data signals;
   b) means for transferring data signals to and from said media;
   c) means, coupled to said transferring means, for processing data signals transferred to and from said media, said processing means including means for providing a data clock signal in relation to data signals transferred from said media, said processing means being responsive to first and second control signals where said first and second control signals are provided at respective ones of respective pluralities of signal levels, said processing means including:
      means for determining whether data signals transferred from said media exceed a data discrimination level, said determining means being responsive to the level of said first control signal for selecting said data discrimination level from a plurality of data discrimination levels;
      means for selecting a relative timing offset for data signal windows independent of said data discrimination level selected, said relative timing offset being an offset in time relative to the occurrence of signal level transitions in said data clock signal, said data signal windows being timing windows within which to accept data signals transferred from said media, said selecting means being responsive to the level of said second control signal for selecting said relative timing offset of said data signal windows from a plurality of relative timing offsets for data signal windows; and
   d) control means, coupled to said processing means, for determining the ones of said pluralities of signal levels at which said first and second control signals are provided to said processing means.

7. A disk drive that is individually adaptable to the operating parameters of a disk media and data transfer channel, said disk drive comprising:
   a) rotating media providing for the magnetic storage of data in a plurality of data tracks provided within an inner and an outer track diameter;
   b) a data transfer channel providing for the transfer of data with respect to said rotating media, said data transfer channel including a data head positionable with respect to said plurality of data tracks, said data head transferring data from said rotating media as a read data signal having signal transitions qualified by mutually relative time of occurrence and amplitude, threshold means, coupled to said data head, for identifying the occurrence of data signal transitions exceeding a discrimination threshold, said threshold means being programmable in response to a first programmed value for selecting said discrimination threshold from a plurality of said discrimination threshold levels;
   c) means, coupled to said data head and responsive to a position control signal, for positioning said data head with respect to said rotating media within said inner and outer diameters; and
   d) control means for controlling said data transfer channel and said positioning means, said control means including positioner control means, responsive to a position control value, for providing said position control signal and threshold control means, responsive to a threshold value, for providing said first programmed value and processor means for selecting said position control value and said threshold value, said processor means selecting said position control value to position said data head with respect to a predetermined data track and selecting said threshold value to set said discrimination threshold with respect to said predetermined data track, said processor means providing said position control value and said threshold value to said positioner control means and said threshold control means, whereby said processor means is capable of independently adjusting the operating parameters of said data transfer channel with respect to predetermined ones of said plurality of data tracks to improve the discrimination of data transferred from said rotating media.

8. The disk drive of claim 7 wherein said data transfer channel includes clock means for recovering a data clock signal from data transferred from said rotating media and data window timing means, coupled to said threshold means, for establishing a time offset, relative to a respective predetermined transition in said data clock signal, for a respective occurrence of a data acceptance window, said data window timing means being independently programmable in response to a second programmed value selecting said time offset from a plurality of time offset values, and wherein said control means further includes window control means, responsive to a window value, for providing said second programmed value to said window timing means, said processor means selecting said window value to set said time offset with respect to said predetermined data track, said processor means providing said window value to said window control means.

9. The disk drive of claim 7 or 8 wherein said data transfer channel further includes write current means, coupled to said data head, for establishing a current level for the transfer of data to said rotating media, said write current means being independently programmable in response to a third programmed value selecting said current level from three or more current level values, and wherein said control means further includes write control means, responsive to a current value, for providing said third programmed value to said write current means, said processor means selecting said current value to set the level of current used in transferring data to said rotating media with respect to said predetermined data track, said processor means providing said current value to said write control means.

10. The disk drive of claim 9 wherein said data transfer channel further includes precompensation means, coupled to said data head, for establishing a precompensation level for the transfer of data to said rotating media, said precompensation means being independently programmable in response to a fourth programmed value defining said precompensation level, said processor means selecting said fourth value to set the level of precompensation used in transferring data to said rotating media with respect to said predetermined data track, said processor means providing said fourth value to said precompensation means.

* * * * *